US009815449B2

(12) United States Patent
Inoue et al.

(10) Patent No.: US 9,815,449 B2
(45) Date of Patent: Nov. 14, 2017

(54) DRIVING SUPPORT CONTROL APPARATUS FOR VEHICLE

(71) Applicant: TOYOTA JIDOSHA KABUSHIKI KAISHA, Toyota-shi, Aichi-ken (JP)

(72) Inventors: Shintaro Inoue, Kanagawa-ken (JP); Hideo Inoue, Kanagawa-ken (JP); Yutaka Hirano, Susono (JP); Pongsathorn Raksincharoensak, Koganei (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 46 days.

(21) Appl. No.: 15/091,230

(22) Filed: Apr. 5, 2016

(65) Prior Publication Data
US 2016/0297439 A1 Oct. 13, 2016

(30) Foreign Application Priority Data

Apr. 8, 2015 (JP) .................................. 2015-079631

(51) Int. Cl.
*B60W 10/20* (2006.01)
*B60W 10/04* (2006.01)
(Continued)

(52) U.S. Cl.
CPC ............ *B60W 10/20* (2013.01); *B60W 10/04* (2013.01); *B60W 10/184* (2013.01);
(Continued)

(58) Field of Classification Search
CPC ....... B60W 10/184; B60W 2050/0008; B60W 2540/30; B60W 2050/0024;
(Continued)

(56) References Cited

U.S. PATENT DOCUMENTS 6,154,696 A * 11/2000 Nishi ................... B62D 5/0472
180/233
6,360,153 B1 * 3/2002 Shinmura ............... B60K 17/16
180/233

(Continued)

FOREIGN PATENT DOCUMENTS

| JP | 2000-072021 A | 3/2000 |
|---|---|---|
| JP | 4173292 B2 | 8/2008 |
| JP | 2010-042741 A | 2/2010 |

*Primary Examiner* — Jason Holloway
(74) *Attorney, Agent, or Firm* — Sughrue Mion, PLLC

(57) ABSTRACT

An apparatus as an aspect of the invention acquires a vehicle motion index value, a driving state index value of a driver, a driving characteristic value that is estimated based on the vehicle motion index value and the driving state index value, and a vehicle motion target value and a driving state target value that are determined regardless of the driver's driving. Using these values, the apparatus determines a target value of a steering assist torque and a target value of a difference in braking/driving force between right and left wheels that converge at least one of a difference between the vehicle motion target value and the vehicle motion index value and a difference between the driving state target value and the driving state index value. The apparatus controls the steering assist torque and the difference in braking/driving force between the right and left wheels to their respective target values.

7 Claims, 4 Drawing Sheets

DRIVER DRIVING STATE INDEX VALUES (DRIVER INPUTS)

(51) Int. Cl.
  *B60W 10/184*  (2012.01)
  *B60W 50/00*  (2006.01)

(52) U.S. Cl.
  CPC .............. *B60W 2050/0008* (2013.01); *B60W 2050/0024* (2013.01); *B60W 2540/28* (2013.01); *B60W 2540/30* (2013.01)

(58) Field of Classification Search
  CPC ............ B60W 2540/28; B60W 10/20; B60W 2540/18; B60W 2510/202; B60W 10/08; B60W 10/18; B60W 40/08; B60W 10/04; B60W 30/00; B60W 40/10
  See application file for complete search history.

(56) References Cited

U.S. PATENT DOCUMENTS

| | | | |
|---|---|---|---|
| 8,543,300 B2* | 9/2013 | Matsuno | B60T 8/1755 |
| | | | 701/53 |
| 8,880,316 B2* | 11/2014 | Nishikawa | B60T 8/1755 |
| | | | 701/41 |
| 9,669,813 B2* | 6/2017 | Inoue | B60T 8/246 |
| 9,682,722 B2* | 6/2017 | Tamaizumi | B62D 5/0463 |
| 9,694,844 B2* | 7/2017 | Maeda | B62D 5/0463 |
| 2007/0233344 A1* | 10/2007 | Satake | B62D 5/0463 |
| | | | 701/41 |
| 2012/0226417 A1* | 9/2012 | Nishikawa | B60T 8/1755 |
| | | | 701/42 |
| 2016/0236679 A1* | 8/2016 | Inoue | B60W 10/20 |
| 2016/0297478 A1* | 10/2016 | Inoue | B60T 8/246 |

* cited by examiner

DRIVER DRIVING STATE INDEX VALUES (DRIVER INPUTS)

DRIVING SUPPORT CONTROL APPARATUS FOR VEHICLE

The disclosure of Japanese Patent Application No. 2015-079631 filed on Apr. 8, 2015 including the specification, drawings and abstract is incorporated herein by reference in its entirety.

BACKGROUND OF THE INVENTION

1. Field of the Invention

An aspect of the invention relates to an apparatus for supporting the driving of a vehicle such as an automobile or the like, and more particularly, to an apparatus that performs driving support in a vehicle that is equipped with a steering assist mechanism and a right/left braking/driving force distribution mechanism (a direct yaw moment control mechanism, a torque vectoring mechanism or the like) while attempting to coordinate operation control of the mechanisms and a driver's steering with each other.

2. Description of Related Art

In the field of driving control of vehicles such as automobiles and the like, various types of vehicle driving support systems or automatic driving systems for controlling steering mechanisms and acceleration/deceleration mechanisms of the vehicles have been proposed so that drivers can more easily drive the vehicles. For example, in lane keeping assist (LKA) control, with a view to preventing a running vehicle from deviating from a lane, when the vehicle is about to drift from the lane, the driver is warned through a warning buzzer or the like. Besides, when radar cruise control is in operation, the support for the driver's steering is provided such that the vehicle runs along the lane while performing speed control for maintaining the vehicle speed at a set speed without requiring the driver to continue to depress an accelerator pedal. Besides, in the case of intelligent parking assistant (IPA), the support for steering is provided in parallel-parking the vehicle or putting the vehicle into a garage. Furthermore, in U.S. Pat. No. 4,173,292, there is disclosed a configuration that makes it easy for a driver to adjust the steering angle to an optimal steering angle calculated based on information on a surrounding environment, by changing the steering reaction force of a steering wheel in such a manner as to approach the optimal steering angle, in changing lanes. In Japanese Patent Application Publication No. 2010-042741 (JP 2010-042741 A), there is disclosed a driving support method that is configured to determine a target steering angle based on information on a periphery of a vehicle, increase a steering assist force in the same direction as the target steering angle, and reduce the steering assist force in the opposite direction of the target steering angle. Furthermore, in Japanese Patent Application Publication No. 2000-72021 (JP 2000-72021 A), there is disclosed a driving support method that is configured to calculate a lateral acceleration correction amount for causing a vehicle to move toward a target position determined through the use of an image of an onboard camera, detect a magnitude of a steering amount of a driver, perform steering control in such a manner as to achieve the lateral acceleration correction amount after decelerating the vehicle when the steering amount is smaller than a predetermined threshold, and decelerate the vehicle in such a manner as to achieve the lateral acceleration correction amount after performing steering control when the steering amount is larger than the predetermined threshold.

In general terms, the driving support system or automatic driving system as described above is configured to select either control based only on the system, namely, a mechanical input (the mechanical input - a target input that is mechanically set based on information on the surrounding environment and the like) or control based only on the driver's input (the driver's steering input or a target input that is set based thereon) as operation control of the vehicle, or lead the driver's steering to a target state determined based on the mechanical input. For example, in the case of a cruise control system, when the driver carries out the override of operation control by the system such as steering input, accelerator/brake pedal input and the like for the sake of a right/left turn, lane change or emergency avoidance while the system is in operation, the system stops the operation control according to the mechanical input, and the motion of the vehicle is thereafter controlled based on the driver's input. In the case of the IPA as well, the operation thereof is suspended through the override by the driver's manipulation of the steering wheel. Besides, in the case of the configuration that determines a target value such as an optimal steering angle, a target steering angle or the like based on information on the periphery of the vehicle or the like and that makes it easy to steer the vehicle in the direction toward the target value as described in U.S. Pat. No. 4,173,292 or Japanese Patent Application Publication No. 2010-042741 (JP 2010-042741 A), or the configuration in which it is determined which one of steering control and deceleration of the vehicle is first performed in accordance with the magnitude of the steering amount of the driver in realizing the lateral acceleration correction amount that is determined based on information on the periphery of the vehicle and the like as in Japanese Patent Application Publication No. 2000-72021 (JP 2000-72021 A), the intention or characteristics (how to react to situations, the habit and the like) in the driver's own driving are hardly reflected by the motion of the vehicle during the operation of the driving support control. Therefore, this control can be substantially identified as the control based only on the mechanical input.

The control based only on the mechanical input as described above is expected to enable more efficient driving of the vehicle than the control based only on the driver's input. Besides, while the weight saving of the vehicle is expected from the standpoint of environmental issues and demands for low fuel consumption and low electric power costs, there is an apprehension that the stability against crosswind and road surface disturbances may deteriorate in the case of a lightweight vehicle for reasons of a small moment of inertia in the yaw direction, a deterioration in aerodynamic performance and the like. Therefore, the usefulness of driving support control based on the mechanical input is enhanced. However, if the operation state based only on the mechanical input is maintained in the vehicle in which the system for driving support control as described above is in operation (in this case, the vehicle is in a completely automatic driving state), the steering based on the intention or characteristics in the driver's own driving is substantially not reflected by the motion of the vehicle. Therefore, when the motion of the vehicle is different from a motion expected from the driver's steering, the driver can develop a feeling of strangeness for the difference. In regard to this point, when a steering wheel is not mechanically directly coupled to tires in the configuration of the vehicle, the driver finds it difficult to sensuously grasp a state of the running vehicle during the performance of the control based only on the mechanical input. While it is conceivable to adopt a configuration in which an apparent steering reaction force and an apparent pedal reaction force are given to the driver from a result of the motion of the vehicle through the use of, for example, a steer-by-wire system in order to solve the above problem, the driver still finds it difficult to instinctively perceive the state of the vehicle driven by himself or herself as a result of a delay in acquiring information on the surrounding environment and a delay in control computation. On the other hand, in the case of a vehicle in which a steering wheel is mechanically directly coupled to tires, the driver can keenly and directly feel information on a steering angle and information on a reaction torque, via his or her hands that grip the steering wheel. Meanwhile, for example, when a large control input is realized only by a steering mechanism in entering a curve with a view to causing the locus of the vehicle to follow a mechanically set target locus, a large steering angle input and a large steering reaction force are generated, and the driver who grips the steering wheel feels, via the senses of his or her hands, differences between a steering angle and a torque that the driver himself or herself tries to input and the large steering angle input and the large steering reaction force that correspond to the mechanical control input.

From the standpoint of driving comfort, the driver is prevented from developing a feeling of strangeness due to the performance of the control based on the mechanical input in the driving support system or the automatic driving system as described above. Besides, even in the case where efficient driving of the vehicle can be achieved through the control based on the mechanical input, when the driver's steering is not reflected at all by the driving state of the vehicle, the feeling of strangeness developed by the driver for driving will be increased. However, in the case of a configuration in which the driving state of the vehicle as described above is alternatively selected from the operation based only on the mechanical input and the operation based only on the driver's input, when the operation based only on the driver's input is selected to alleviate the feeling of strangeness developed by the driver or achieve the driver's intention or characteristics, the advantageous effect of the control based on the mechanical input is hardly obtained. Besides, in the case of a configuration in which the driver's steering is led such that the driving state of the vehicle follows the operation based on the mechanical input, when the difference in magnitude or changing pattern between the steering angle input or steering force for realizing the motion state of the vehicle (the target value of the motion of the vehicle) that is determined based on the mechanical input and the steering angle or steering force that the driver himself or herself tries to input becomes large as described above, the feeling of strangeness developed by the driver for the fact that the steering angle or steering force that the driver tries to input, namely, the driver's steering is not reflected is increased.

SUMMARY OF THE INVENTION

It is thus an object of the invention to provide a configuration that can alleviate, as much as possible, the feeling of strangeness developed by a driver even during the operation of control based on a mechanical input, in a driving support system or an automatic driving system for a vehicle.

According to one aspect of the invention, there is provided a driving support control apparatus for a vehicle that is equipped with a steering assist mechanism and a braking/driving force distribution mechanism for right and left wheels. The apparatus includes a vehicle motion index value acquisition portion, a driving state index value acquisition portion, a driver driving characteristic value estimation portion, a vehicle motion/driving state target value determination portion, a control target value determination portion, a steering assist torque control portion, and a right/left braking/driving force difference control portion. The vehicle motion index value acquisition portion acquires a vehicle motion index value as an index value of a motion state of the vehicle. The driving state index value acquisition portion acquires a driving state index value as an index value of a driving state of a driver of the vehicle. The driver driving characteristic value estimation portion estimates a driver driving characteristic value representing driving characteristics of the driver, based on the vehicle motion index value and the driving state index value. The vehicle motion/driving state target value determination portion determines a vehicle motion target value as a target value of the vehicle motion index value and a driving state target value as a target value of the driving state index value in driving support control, regardless of the driver's driving. The control target value determination portion determines a target value of a steering assist torque and a target value of a difference in braking/driving force between the right and left wheels that converge at least one of a difference between the vehicle motion target value and the vehicle motion index value and a difference between the driving state target value and the driving state index value, using a vehicle motion characteristic value representing motion characteristics of the vehicle, the driver driving characteristic value, the vehicle motion index value and the driving state index value. The steering assist torque control portion controls a steering assist torque that is given by the steering assist mechanism, to the target value of the steering assist torque. The right/left braking/driving force difference control portion controls a difference in braking/driving force between the right and left wheels that is given by the braking/driving force distribution mechanism for the right and left wheels, to the target value of the difference in braking/driving force between the right and left wheels.

In the aforementioned configuration, "the steering assist mechanism" may be a device that assists the driver in steering the vehicle by adding a steering torque when the driver steers the vehicle through the use of a steering wheel or the like, for example, a power steering device or the like, as is well known in this field. "The steering assist torque" is a torque that is given by this steering assist mechanism. Besides, "the braking/driving force distribution mechanism for the right and left wheels" may be a mechanism that can arbitrarily adjust the magnitudes and/or ratios of braking/driving forces in the respective right and left wheels of the vehicle. A mechanism based on various types of right/left driving force distribution differentials that distribute a driving force transmitted from a single prime mover (an engine or a motor) via a propeller shaft to the right and left wheels at an arbitrary ratio, a mechanism that controls the distribution of the braking/driving force by arbitrarily adjusting the braking forces of the right and left wheels, or a mechanism that can control the braking/driving forces of the right and left wheels independently of one another with the aid of an in-wheel motor may be adopted. "Driving support control" is the control of causing the vehicle to run along a locus or direction that is decided or determined as a favorable locus or direction based on information on a periphery of the vehicle or the like, by controlling the steering angle or turning direction (a steering torque, a yaw rate, a yaw moment and the like) of the vehicle and/or the speed or acceleration/deceleration of the vehicle. For example, a driving support system such as the LKA, the IPA or the like as described already may be employed. Alternatively, a favorable running route (a favorable future locus) to a destination desired by the driver may be set, and the operation control of a steering mechanism or acceleration/deceleration mechanism of the vehicle may be performed such that the vehicle is favorably driven along the future locus. "The vehicle motion index value" may be constituted of a single or a plurality of index values representing the motion state of the vehicle. For example, "the vehicle motion index value" may include a lateral displacement, a lateral speed, a yaw angle, a yaw rate, a steering angle, a steering angle change speed, a lateral acceleration and the like of the vehicle. However, it should be understood that the motion index value is not limited to these values. The motion index value may include other arbitrary index values representing the motion of the vehicle, for example, a longitudinal displacement, a vehicle speed, a slip angle and the like. The kind(s) and number of the actually selected "vehicle motion index value(s)" may be appropriately determined. "The vehicle motion target value" is a target value of "the vehicle motion index value" in driving support control, and may be a vehicle motion index value that is calculated on the assumption that a target displacement of the vehicle that is determined by an arbitrary system or device (i.e., a target that is determined based on a mechanical input) is realized by the driving by a normative driver model, using, for example, information on the periphery of the vehicle, that is, information obtained from a camera, radar sensors, a GPS device and the like, and information on the future locus as described hereinabove, regardless of the driver's actual steering. "The normative driver model" may be a model of the driver having ideal response characteristics in driving the vehicle. The ideal response characteristics may be appropriately set by a designer of the apparatus. "The driving state index value" of the driver is an index value representing a state of driving (steering and acceleration/deceleration) that is given to the vehicle by the driver, and may be, for example, a steering angle, a steering angle change speed, a steering torque or the like. Incidentally, the value representing the driving operation that is given to the vehicle by the driver, such as the steering angle, the steering angle change speed, the steering torque or the like can also be considered to be a value representing the motion state of the vehicle, and may be treated as the vehicle motion index value. The kind(s) and number of the actually selected "driving state index value(s)" may be appropriately determined. "The driving state target value" is a target value of "the driving state index value" of the driver, and may be an index value of a state of the driving that is carried out by the driver on the assumption that the target displacement of the vehicle that is determined regardless of the driver's actual driving in driving support control is realized by the normative driver model as described above. That is, "the driving state target value" may be a driving state index value that is given by the driving by the normative driver model. "The driver driving characteristic value" is an index value representing the characteristics in the driver's driving, and may be a steering gain of the driver in a forward gaze model, a first-order lag time constant of the driver, a forward gaze time or the like. The kind(s) and number of the actually selected "driver driving characteristic value(s)" may be appropriately determined. "The vehicle motion characteristic value" is a characteristic value that gives characteristics that determine the motion of the vehicle when inputs such as a steering torque and a difference in braking/driving force between the right and left wheels are given during motion of the vehicle, namely, the vehicle motion index value. For example, "the vehicle motion characteristic value" may include values representing a vehicle weight, a moment of inertia in the yaw direction, cornering powers of the tires of the front and rear wheels, a distance between the centers of gravity of respective axles of the front and rear wheels, other motion characteristics of the vehicle. The kind(s) and number of the actually selected "vehicle motion characteristic value(s)" may be appropriately determined. Then, as described above, "the target value of the steering assist torque" that should be realized by the steering assist mechanism and "the target value of the difference in braking/driving force between the right and left wheels" that should be realized by the braking/driving force distribution mechanism for the right and left wheels are calculated in such a manner as to converge at least one of the difference between the vehicle motion target value and the vehicle motion index value and the difference between the driving state target value and the driving state index value, using the driver driving characteristic value, the vehicle motion characteristic value, the vehicle motion index value and the driving state index value, and are realized in the steering assist mechanism and the braking/driving force distribution mechanism for the right and left wheels, respectively.

In the configuration of the aforementioned apparatus according to the aspect of the invention, first of all, with a view to achieving driving support control as described above, "the braking/driving force distribution mechanism for the right and left wheels" as well as "the steering assist mechanism" is adopted as "an actuator" that gives a steering torque or a yaw moment to the vehicle. Thus, controlled variables that are imparted to the vehicle in driving support control can also be distributed by the braking/driving force distribution mechanism for the right and left wheels. The controlled variables for the steering assist mechanism are reduced (in comparison with the case where driving support control is performed only by the steering assist mechanism). Then, for the driver who sensuously grasps the state of the steering mechanism by gripping the steering wheel with his or her hands, the operation amount of the steering assist mechanism according to driving support control (which is different from the operation according to the manipulation of the steering wheel by himself or herself) is reduced. Therefore, the alleviation of a feeling of strangeness developed by the driver is expected.

Besides, in the control target value determination portion of the apparatus according to the aspect of the invention, the control target values that are given to "the steering assist mechanism" and "the braking/driving force distribution mechanism for the right and left wheels" especially for driving support control are calculated in such a manner as to converge at least one of the difference between the vehicle motion target value and the vehicle motion index value and the difference between the driving state target value and the driving state index value, using the vehicle motion characteristic value, the driver driving characteristic value, the vehicle motion index value and the driving state index value. That is, driving support control in the apparatus of the invention can be said to be state feedback control that makes the actual motion state of the vehicle coincident with a target motion state (in this state feedback control system, the control target values, namely, the target value of the steering assist torque and the target value of the difference in braking/driving force between the right and left wheels are feedback inputs of the system, and the difference between the vehicle motion target value and the vehicle motion index value and/or the difference between the driving state target value and the driving state index value and/is (an) output(s) of the system).

In regard to this point, in the case of this kind of conventional feedback control system for the motion of the vehicle, attention is typically focused only on the motion of the vehicle, and there is adopted a configuration in which the control target values (the feedback input values) are determined in such a manner as to converge the difference between the vehicle motion target value and the vehicle motion index value using the vehicle motion characteristic value. In this case, the driver's steering is treated as a disturbance in the system, and the control target values do not take the driver's steering into account. Accordingly, as described already, when the deviation between the driver's steering and the steering that is carried out by the inputs required in feedback control increases, the driver develops a feeling of strangeness for the operation according to the control.

By contrast, in the aspect of the invention, as described above, in computing the control target values, the driver driving characteristic value, the driving state index value and the driving state target value are used in addition to the vehicle motion characteristic value, the vehicle motion index value and the vehicle motion target value. That is, in the configuration of the invention, a structure that gives a response to an input in the motion of the vehicle and a structure in which the actual driver gives a response to an input are together considered to be an integral system. Thus, with the response in the driver's driving also integrated into the response of the system as described above, the control target values as the feedback input values are determined. According to the configuration of this system, the response in the driver's driving is taken into account as part of the response of the system, and the control target values are determined while reflecting the response characteristics and the current state in the driver's driving. Therefore, the contribution resulting from the driver's steering has already been reflected in the control target values. Accordingly, the deviation of the driver's steering from the control target values decreases. Thus, the reduction in a feeling of strangeness developed by the driver for the control operation is expected. Besides, the motion itself of the vehicle is controlled such that the difference between the vehicle motion target value and the vehicle motion index value and/or the difference between the driving state target value and the driving state index value converge(s). Therefore, motion control of the vehicle is realized in such a manner as to realize the target displacement of the vehicle that is determined based on information on the periphery of the vehicle, a target course or the like in driving support control, namely, such that efficient driving of the vehicle can be achieved through the control based on the mechanical input as described above.

Incidentally, in the aforementioned configuration, as for calculation of the control target values in such a manner as to converge at least one of the difference between the vehicle motion target value and the vehicle motion index value and the difference between the driving state target value and the driving state index value, the parameter to which the difference between the target value and the index value (the actual value) should be converged may be arbitrarily selected. As will be described later in the section of detailed description of the embodiment of the invention, while the vehicle motion index value and the driving state index value are parameters in the system that is treated integrally, the vehicle motion target value and the driving state target value as the target values thereof are values that should be realized in the respective index values on the assumption that the target displacement of the vehicle (the mechanical input) that is determined regardless of the driver's actual steering is realized by the normative driver model. That is, the target values of both the parameters are values that are calculated on the assumption that the target displacement of the vehicle is realized by the normative driver model. Therefore, when at least one of those parameters is converged, the motion of the vehicle may be considered to generally follow the target displacement of the vehicle.

In state feedback control according to the aforementioned aspect of the invention, the target value of the steering assist torque and the target value of the difference in braking/driving force between the right and left wheels as feedback inputs may be calculated, in more concrete terms, using a theory of an optimal regulator. In this case, an equation of state constituting the system of the optimal regulator may be structured by making an equation of motion describing the motion of the vehicle and also an equation of state giving the steering torque of the driver simultaneous with each other. That is, in the aforementioned aspect of the invention, the control target value determination portion may be configured to include a feedback gain calculation portion and a control target value calculation portion. The feedback gain calculation portion calculates a feedback gain that converges at least one of the difference between the vehicle motion target value and the vehicle motion index value and the difference between the driving state target value and the driving state index value, using a theory of an optimal regulator, from an equation of state representing the motion state of the vehicle and the driving state of the driver, which is obtained by making respective equations of motion in a lateral direction of the vehicle, a yaw direction of the vehicle and a rotational direction of steered wheels that are represented using the vehicle motion characteristic value, and also an equation of state that gives a steering torque of the driver that is represented using the estimated driver driving characteristic value, simultaneous with one another. The control target value calculation portion calculates the target value of the steering assist torque and the target value of the difference in braking/driving force between the right and left wheels, using at least one of the difference between the vehicle motion target value and the vehicle motion index value and the difference between the driving state target value and the driving state index value, and the feedback gain. According to the aforementioned configuration, in calculating the feedback gain according to the theory of the optimal regulator, the equation of state in which the driver gives the steering torque is used. Therefore, the response characteristics of the driver are reflected by the target value of the steering assist torque and the target value of the difference in braking/driving force between the right and left wheels. In consequence, as described already, the deviation of the driver's steering from the input required in feedback control decreases while achieving the followability of the target displacement of the vehicle, which is determined based on information on the periphery of the vehicle, the target course of the vehicle or the like, by the motion of the vehicle. Thus, a further alleviation of a feeling of strangeness developed by the driver is expected.

Furthermore, in the configuration of the aforementioned apparatus according to the aspect of the invention, in calculating the control target values, the driver driving characteristic value, which is estimated in the driver who actually drives the vehicle based on the vehicle motion index value and the driving state index value, is used. Therefore, the control target values reflect the response in the driver's driving who actually drives the vehicle, and can be values more suited for the driving characteristics of the driver.

Thus, the possibility of more effectively reducing a feeling of strangeness developed by the driver for the control operation is expected. Besides, the driver driving characteristic value of each driver who actually drives the vehicle can also be estimated. Therefore, the influence of the individual difference in the response characteristics of driving for the aforementioned control can also be reduced.

By the way, when a certain driver drives the vehicle, the driving characteristics can change depending on various factors. For example, when the driving time lengthens or the surrounding environment of the vehicle changes (changes in the weather, changes in time zone, changes in road condition or the like), the response characteristics of even the same driver can change. Thus, in the aforementioned apparatus according to the aspect of the invention, the driver driving characteristic value estimation portion may carry out, on a timely basis or sequentially, estimation of the driver driving characteristic value, and the most recently estimated driver driving characteristic value may be utilized to calculate the control target values (or to calculate the feedback gain). Thus, as described above, in the case where calculation of the feedback gain according to the theory of the optimal regulator is carried out, the feedback gain calculation portion may be configured to update the feedback gain using the most recently estimated driver driving characteristic value, when a predetermined condition is fulfilled.

As an aspect of the predetermined condition regarding the update of the aforementioned feedback gain, for example, the update of the feedback gain may be carried out every time a predetermined time elapses. Besides, in another aspect of the update of the feedback gain, the feedback gain calculation portion may be configured to carry out update of the feedback gain when an evaluation function that increases or decreases as a magnitude of a difference between the estimated driver driving characteristic value and a normative driver driving characteristic value as a driver driving characteristic value of a corresponding normative driver model increases, deviates from a predetermined range. As mentioned already, "the normative driver model" may be a model of the driver having ideal response characteristics in driving the vehicle. Incidentally, in the case where the evaluation function increases as the difference between the driver driving characteristic value and the normative driver driving characteristic value increases, the update of the feedback gain may be carried out when the evaluation function exceeds a predetermined threshold. In the case where the evaluation function decreases as the difference between the driver driving characteristic value and the normative driver driving characteristic value increases, the update of the feedback gain may be carried out when the evaluation function drops below the predetermined threshold. According to this configuration, when the change in the driver driving characteristic value becomes large during driving of the vehicle by a certain driver, namely, when the response characteristics in the driver's driving greatly change, the update of the feedback gain is reliably carried out. Thus, the control target values can be held such that the driver is restrained from developing a feeling of strangeness.

In concrete terms, the aforementioned evaluation function may be a function of a difference between the estimated driver driving characteristic value and the normative driver driving characteristic value. As will be indicated later in the section of detailed description of the embodiment of the invention, the aforementioned evaluation function may be, for example, a quadratic form of the difference between the driver driving characteristic value and the normative driver driving characteristic value. Besides, the evaluation function may increase/decrease based on the driving history of the driver, the driving characteristics of the driver and/or information on the periphery of the vehicle, separately from changes in the difference between the driver driving characteristic value and the normative driver driving characteristic value. For example, in the case where the evaluation function is a quadratic form of the difference between the driver driving characteristic value and the normative driver driving characteristic value, the weight (coefficient) in the term of the difference between the driver driving characteristic value and the normative driver driving characteristic value may be changeable based on the driving history of the driver, the driving characteristics of the driver and/or information on the periphery of the vehicle. Thus, the update of the feedback gain can be carried out at a precise timing corresponding to the running situation of the vehicle and the driver.

Incidentally, in the aforementioned configuration, the driver driving characteristic value is estimated based on the vehicle motion index value and the driving state index value. Therefore, during the performance of driving support control, the driver driving characteristic value is a value representing the driving characteristic in a state where the steering assist torque and the difference in braking/driving force between the right and left wheels are given through control, namely, a value representing apparent driving characteristics (instead of the intrinsic characteristics of the driver). Accordingly, in the case where driving support control is performed using the driver driving characteristic value that is estimated at a certain time point, until a certain time elapses immediately after estimation of this driver driving characteristic value, the estimated driver driving characteristic value is expected to be a value close to the normative driver driving characteristic value. The magnitude of the difference between the driver driving characteristic value and the normative driver driving characteristic value becomes large when the true driving characteristics of the driver change as a result of the lapse of a certain time after estimation of the driver driving characteristic value at a certain time point.

In the aforementioned configuration, when the degree of change in the driving characteristics of the driver is large and the speed thereof is high, the magnitude of the difference between the driver driving characteristic value and the normative driver driving characteristic value repeatedly increases, and the number of times of the update of the feedback gain becomes large. In the case where the degree of change in the driving characteristics of the driver is large and the speed thereof is high, the driver may not feel well or the running environment of the vehicle may change drastically, etc. Thus, with a view to making the driver realize such a case, according to the aspect of the invention, a awareness promotion portion that promotes awareness of the driver, namely, displaying a warning, issuing an alarm or the like when the number of times the feedback gain is updated exceeds a predetermined number of times may be provided. According to this configuration, the driver can grasp the degree of change in response characteristics in his or her own driving. Therefore, there is an advantage in that the safety during running of the vehicle can be enhanced.

Thus, in the aforementioned apparatus according to the aspect of the invention, in state feedback control for performing driving support control, the response of the driver is taken into account in calculating the feedback input values, namely, the control target values, by using the response characteristics of the driver as well as the response characteristics of the motion of the vehicle. According to this configuration, in the process of realizing the target vehicle motion state required through the mechanical input, namely, in the process of achieving the target displacement of the vehicle that is determined by an arbitrary system or device, using information on the periphery of the vehicle, that is, information obtained from a camera, radar sensors, a GPS device and the like and information on the future locus, driving support control is performed through the control target values that are determined in such a manner as to converge the motion of the vehicle to a target state of the vehicle on the premise that there is an input given from the driver, namely, that there is a response of the driver. In this control configuration, while the state where the actual motion state of the vehicle is converged is a state that is determined through the mechanical input, the control operation is performed in consideration of the driver's driving (a driver input) that is assumed from the estimated driving characteristics, in the process of convergence of that state. Therefore, the deviation between the driver's actual driving and the operation of the vehicle according to the control target values decreases. Thus, an attempt is made to reduce the feeling of strangeness developed by the driver for the control operation. In other words, in the case of the invention, driving support control is performed regarding the driver's steering not as a disturbance but as part of the system. Thus, the cooperativeness with the driver's driving in driving support control is enhanced, and an attempt is hence made to enhance the comfort of driving.

Other objects and advantages of the invention will become apparent from the following description of an embodiment of the invention.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Configuration of Vehicle

Figure 1:
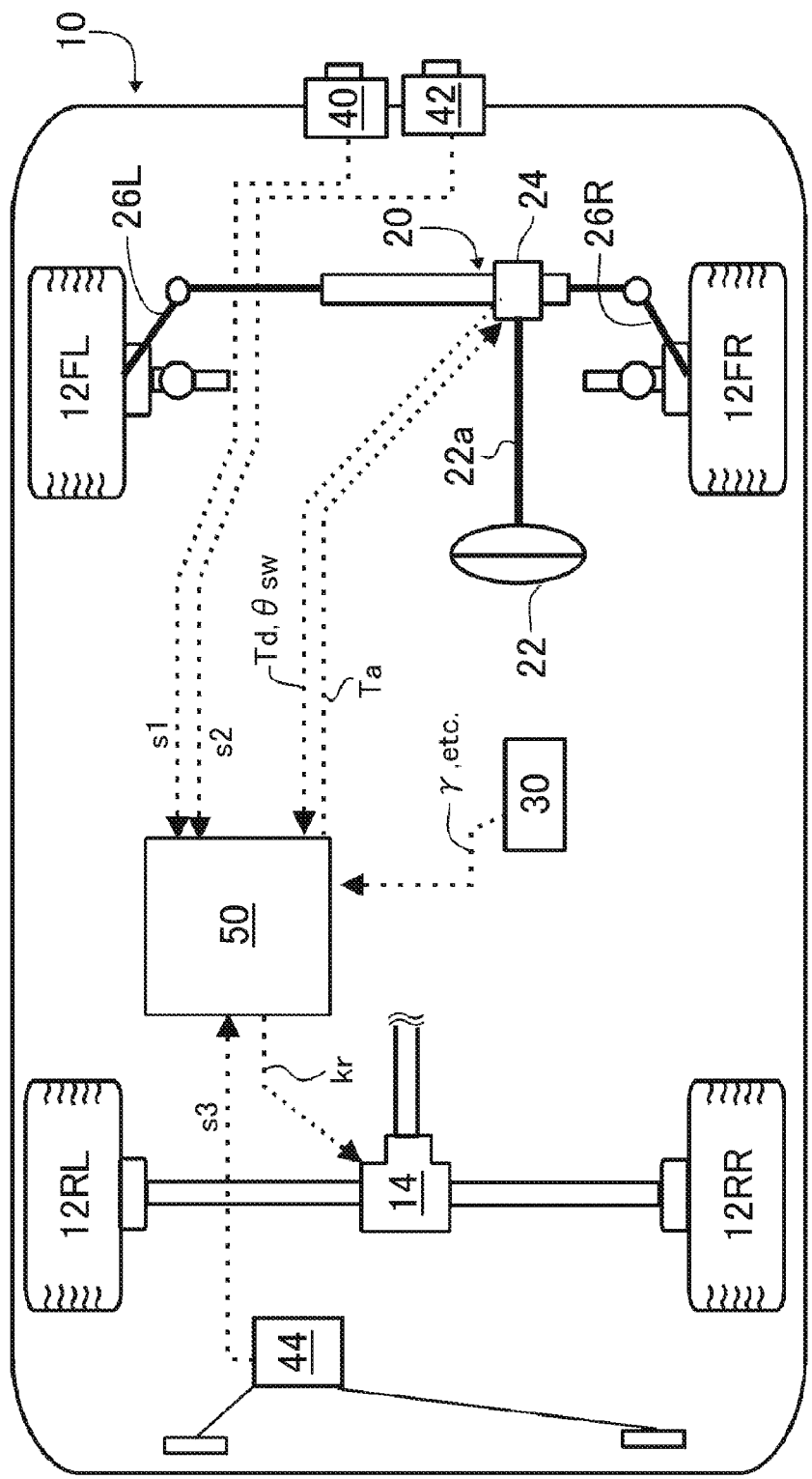
FIG. 1 is a schematic view of a vehicle that is mounted with a driving support control apparatus for a vehicle according to the embodiment of the invention.

Referring to FIG. 1, a vehicle 10 such as an automobile or the like, into which a driving support control apparatus according to the invention is integrated, is mounted, in a normal aspect, with front-right and front-left wheels 12FR and 12FL, rear-right and rear-left wheels 12RR and 12RL, a drive train device (only partly shown) that generates braking/driving forces for the respective wheels (only for the rear wheels because the vehicle of the example shown in the drawing is a rear-wheel-drive vehicle) in accordance with depression of an accelerator pedal by a driver, a steering device 20 for controlling the steering angle of the front wheels (a steering device for the rear wheels may be further provided), and a braking system device (not shown) that generates braking forces for the respective wheels. In the normal aspect, the drive train device is configured such that a driving torque or a rotational force is transmitted from an engine and/or an electric motor (not shown, a hybrid-type drive device having both the engine and the electric motor may be employed) to the rear wheels 12RR and 12RL via a transmission (not shown) and a differential gear device 14. In the case where torque vectoring control is performed by adjusting the distribution of the driving forces transmitted to the right and left wheels, a right/left driving force distribution differential capable of performing this torque vectoring control may be adopted as the differential gear device 14. Incidentally, in the differential gear device 14, the distribution of the braking/driving forces of the right and left wheels may be adjusted by adjusting the distribution of the braking forces of the right and left wheels. Furthermore, the drive train device may be a drive device of an in-wheel motor type. In this case, the braking/driving forces that are generated individually for the right and left wheels are adjusted. Besides, the control of distributing the braking/driving forces to the right and left wheels may be performed by adjusting the braking forces of the respective wheels independently of one another with the aid of the braking system device.

A power steering device that transmits rotation of a steering wheel 22 operated by the driver to tie rods 26R and 26L while boosting a rotational torque of the steering wheel 22 with the aid of a boosting device 24 and that turns the front wheels 12FR and 12FL may be adopted as the steering device 20. In the invention in particular, as will be described later, driving characteristics of the driver are detected referring to a driving state of the driver and a motion state of the vehicle, and furthermore, a torque (a steering assist torque) that is applied by the boosting device 24 through driving support control with reference to the driving characteristics is determined. Therefore, a device such as an arbitrary sensor or the like that detects or estimates a steering angle $\theta$sw and/or a torque Td given to the steering wheel by the driver may be provided. Incidentally, in the configuration of the present embodiment of the invention, the steering wheel and steered wheels (the front-right and front-left wheels in the example shown in the drawing) may be mechanically directly coupled to each other to constitute a mechanism, such that a generation state of torque in a yaw direction in the steered wheels (a self-aligning torque or the like) is perceived by the driver through the steering wheel.

Besides, the vehicle 10 to which the driving support control apparatus according to the invention is applied may be provided with an onboard camera 40, a radar device 42 and the like for detecting a situation around the vehicle, for example, a white line (or a yellow line) on the road, other vehicles, obstacles and the like, and a GPS device (a car navigation system) 44 that communicates with a GPS artificial satellite to acquire various pieces of information such as information on the position of the host vehicle and the like.

The operation control of the respective parts of the aforementioned vehicle and the operation control of the driving support control apparatus according to the invention are performed by an electronic control unit 50. The electronic control unit 50 may include a normal-type microcomputer and a drive circuit. The microcomputer has a CPU, a ROM, a RAM and an input/output port device that are coupled to one another by a bidirectional common bus. The configuration and operation of the respective units of the driving support control apparatus according to the invention, which will be described later, may be realized by the operation of the electronic control unit (the computer) 50 according to a program. A steering torque Td of the driver, a steering angle δ of the driver, a yaw rate γ and/or a lateral acceleration Yg from a gyro sensor 30, pieces of information s1 to s3 from the onboard camera 40, the radar device 42 or the like, and the GPS device 44 or the like, and the like are input to the electronic control unit 50. In an aspect that will be described later, control commands representing a steering assist torque Ta, a controlled variable for the control of distributing the braking/driving forces to the right and left wheels (e.g., a driving force distribution ratio kr) and the like are output from the electronic control unit 50 to corresponding devices. Incidentally, although not shown in the drawing, various parameters necessary for various kinds of control that should be performed in the vehicle of the present embodiment of the invention, for example, various detection signals such as a longitudinal G sensor value, wheel speeds and the like may be input to the electronic control unit 50, and various control commands may be output from the electronic control unit 50 to the corresponding devices.

Outline of Driving Support Control According to the Invention

In the art of driving support control according to the invention, with a view to controlling the traveling direction of the vehicle as a method of providing support for the driver's driving (especially steering), first of all, braking/driving force distribution control for the right and left wheels, which is performed by a right/left wheel braking/driving force distribution mechanism (the right/left driving force distribution differential 14 in the example of FIG. 1) as well as steering torque assist control that is performed by the steering device 20 to adjust the steering angle of the steered wheels is adopted. Thus, the controlled variables that are to be obtained through the entire driving support control are partially taken charge of by right/left wheel braking/driving force distribution control, and the controlled variable of the steering assist torque is reduced. Therefore, the difference between the steering torque that the driver tries to give through the steering wheel and the torque that is perceived by the driver from the steering wheel decreases, and an attempt is made to alleviate the feeling of strangeness developed by the driver.

Besides, furthermore, in the invention, the structure that gives a response of the motion of the vehicle and the structure that gives a response in the driver's driving are considered to be an integral system, as driving support control. In this system, state feedback control in which the steering assist torque and the difference in braking/driving force between the right and left wheels are given to the steering torque assist mechanism (the steering device 20) and the right/left wheel braking/driving force distribution mechanism (the right/left driving force distribution differential or braking devices for the respective wheels) respectively as feedback input values is performed. Then, owing to this configuration, the deviation between the controlled variables that are given in driving support control and the response in the driver's driving (steering operation) is reduced, and an attempt is made to further alleviate the feeling of strangeness developed by the driver.

Principle of State Feedback Control in Driving Support Control

Driving support control for the vehicle to which the invention is applied is basically the control of providing support for driving by giving the steering assist torque and the difference in braking/driving force between the right and left wheels to the vehicle as controlled variables such that the motion of the vehicle follows a target state or locus that is set based on information on the periphery of the vehicle and information on a future locus that is favorably set for a destination desired by the driver. However, in such driving support control, as described in the section of "summary of the invention", in the case where the controlled variables are determined based only on the motion of the vehicle, the driver's driving is not taken into account, and the deviation between the motion of the vehicle that is realized by the controlled variables and the motion of the vehicle that is realized by the driver's driving is large, the driver can develop a feeling of strangeness for the motion of the vehicle according to driving support control. Thus, in the invention, the driver's steering is taken into account in the controlled variables in driving support control. Thus, the method of determining the controlled variables in driving support control is improved such that the followability of the target state or locus by the motion of the vehicle is secured while restraining, as much as possible, the motion of the vehicle realized by the controlled variables and the motion of the vehicle realized by the driver's steering from deviating from each other.

In concrete terms, in the present embodiment of the invention, with a view to taking the driver's steering into account, the structure that gives a response in the motion of the vehicle and the structure that gives a response in the driver's driving are modeled as an integral response system. In this model, state feedback control for converging the motion of the vehicle to the target state or locus is performed. In this state feedback control, in the present embodiment of the invention, a state feedback input may be calculated using the theory of an optimal regulator.

More specifically, first of all, when a linear two-wheel model is used as to the motion in a lateral direction of the vehicle and the motion in the yaw direction of the vehicle, an equation of motion in the lateral direction of the vehicle and an equation of motion in the yaw direction of the vehicle are expressed by expressions (1) and (2) shown below respectively, and an equation of motion around the steering wheel is expressed by an expression (3) shown below.

[Formula 1]

$$m\frac{d^2}{dt^2}yc + \frac{2(Kf + Kr)}{V} \cdot \frac{d}{dt}yc + \frac{2(lf \cdot Kf - lr \cdot Kf)}{V} \cdot \frac{d}{dt}\Psi - 2(Kf + Kr)\Psi = \frac{2Kf}{n}\theta sw \quad (1)$$

$$\frac{2(lf \cdot Kf - lr \cdot Kr)}{V} \frac{d}{dt}yc + I\frac{d^2}{dt^2}\Psi + \frac{2(lf^2 \cdot Kf - lr^2 \cdot Kf)}{V} \cdot \frac{d}{dt}\Psi - 2(lf \cdot Kf + lr \cdot Kr)\Psi = \frac{2lf \cdot Kf}{n}\theta sw + Mz \quad (2)$$

$$Is\frac{d^2}{dt}\theta sw = -Cs \cdot \theta sw - \frac{2\xi Kf}{n}\left(\frac{\theta sw}{n} - \frac{lf}{V}\frac{d}{dt}\Psi + \Psi - \frac{1}{V}\frac{d}{dt}yc\right) + Ta + Td \quad (3)$$

It should be noted herein that yc, ψ and θsw denote a lateral position, a yaw angle and a steering angle of the vehicle respectively (dψ/dt denotes the yaw rate γ), and are state variables. Besides, m, Kf, Kr, lf, lr, n, I, Is, Cs and ζ denote a vehicle weight, a front-wheel cornering power, a rear-wheel cornering power, a distance between the front wheels and the center of gravity, a distance between the rear wheels and the center of gravity, a steering ratio, a moment of inertia in the yaw direction of the vehicle, a moment of inertia of rotation of the steering wheel, a steering damping coefficient and a pneumatic trail respectively, and are characteristic values (constants) representing the motion characteristics of the vehicle. Besides, V denotes a vehicle speed (which is treated as a constant in state feedback, but an actually measured value is used in computing the controlled variables later). Furthermore, Ta and Mz denote an input value of the steering assist torque and an input value of the difference between the braking/driving forces distributed to the right and left wheels (a yaw moment) respectively, and are controlled variables of driving support control. Incidentally, in the case where the equations of motion expressed by the aforementioned expressions (1), (2) and (3) are made simultaneous with one another to constitute a differential equation (an equation of state) regarding the motion of the vehicle in which state vectors having yc, ψ, θsw and time derivatives thereof as components are used as variables, there is obtained a system that takes only the response of the motion of the vehicle into account.

As for the driver's steering, on the assumption that a target steering angle θsw* at the time when the driver displaces the vehicle to a target position yd* as to the lateral direction is determined according to a forward gaze model, the target steering angle θsw* is expressed by an expression (4) shown below.

[Formula 2]

$$\theta sw^* = \frac{h}{1 + Tn \cdot s} \{yd^* - (yc + TpV\Psi)\} \quad (4)$$

It should be noted herein that h, Tn and Tp denote a steering gain of the driver, a first-order lag time constant and a forward gaze time respectively, and are characteristic values representing the driving characteristic (the steering characteristics) of the driver. Besides, s denotes a frequency variable after Laplace transformation. Then, on the assumption that the steering torque Td that the driver gives to the steering wheel is proportional to the difference between the target value θsw* of the steering angle and the current value θsw of the steering angle, the steering torque Td is given by Td=Kp(θsw*−θsw) . . . (5) (Kp denotes a mechanical constant that is determined by the steering mechanism). Therefore, when the expression (4) is assigned to θsw* in the expression (5) to achieve transformation into a state space, a differential equation shown below is given after all, as to the steering torque Td of the driver.

[Formula 3]

$$\frac{d}{dt}Td = -\frac{Kp \cdot h \cdot Tp \cdot V}{Tn}\Psi + \frac{Kp \cdot h}{Tn}(yc - yd^*) - Kp\frac{d}{dt}\theta sw - \frac{1}{Tn}Td \quad (6)$$

The aforementioned expression (6) describes the behavior of the steering torque of the driver at the time when a certain value of the target lateral position yd* is given, namely, the response in the driver's driving. Incidentally, in the aforementioned expressions (4) and (6), while the target lateral position yd* of the driver is intrinsically determined through the driver's direct look at the situation around the vehicle, the target lateral position yd* of the driver cannot be acquired in the control apparatus, and the target lateral position yd* of the driver is considered to be substantially equal to a target lateral position Ys* (a mechanical target lateral position) that is determined by the control apparatus (a target locus determination unit that will be described later) based on information on the periphery of the vehicle and information on the future locus. Therefore, in the present embodiment of the invention, a mechanical target lateral position Ys* may be used as an approximated value of the target lateral position yd*.

Thus, in the invention, the equation of state that describes the response in the driver's driving (the expression (6)) is made simultaneous with the foregoing equations of motion (the expressions (1) to (3)) of the motion of the vehicle to constitute an integral system that describes the motion of the vehicle and the driver's driving. In this system, state feedback for converging the state vector to a target state is conceived using the theory of the optimal regulator.

First of all, when the expressions (1) to (3) and (6) are made simultaneous with one another to be rewritten into the form of an equation of state (of a linear system) of a state vector X and an input vector u, that is, dX/dt=A·X+B·u . . . (7), the equation of motion is expressed by an expression shown below.

[Formula 4]

$$\begin{bmatrix} \ddot{\Psi} \\ \dot{\Psi} \\ \ddot{y}c \\ \dot{y}c \\ \ddot{\theta}sw \\ \dot{\theta}sw \\ \dot{T}d \end{bmatrix} = \begin{bmatrix} a11 & a12 & a13 & 0 & 0 & a16 & 0 \\ 1 & 0 & 0 & 0 & 0 & 0 & 0 \\ a31 & a32 & a33 & 0 & 0 & a36 & 0 \\ 0 & 0 & 1 & 0 & 0 & 0 & 0 \\ a51 & a52 & a53 & 0 & a55 & a56 & 1 \\ 0 & 0 & 0 & 0 & 0 & 1 & 0 \\ 0 & a72 & 0 & a74 & a75 & a76 & a77 \end{bmatrix} \begin{bmatrix} \dot{\Psi} \\ \Psi \\ \dot{y}c \\ yc \\ \dot{\theta}sw \\ \theta sw \\ Td \end{bmatrix} + \begin{bmatrix} 0 & b12 \\ 0 & 0 \\ 0 & 0 \\ 0 & 0 \\ b51 & 0 \\ 0 & 0 \\ 0 & 0 \end{bmatrix} \cdot \begin{bmatrix} Ta \\ Mz \end{bmatrix} \quad (8)$$

In the aforementioned expression, variables obtained by adding a dot above yc, ψ, θsw and Td are first-order differentials thereof respectively, and variables obtained by adding two dots above yc, ψ and θsw are second-order differentials thereof respectively. Besides, a11 to a77, b11 and b51 are as follows.

[Formula 5]

$$a11 = -\frac{2(lf^2 Kf + lr^2 Kr)}{IV}, a12 = -\frac{2(lf \cdot Kf - lr \cdot Kr)}{V}, \quad (9)$$

$$a13 = -\frac{2(lf \cdot Kf - lr \cdot Kr)}{IV}, a16 = \frac{2lf \cdot Kf}{I}$$

$$a31 = -\frac{2(lf \cdot Kf + lr \cdot Kr)}{mV}, a32 = \frac{2(Kf + Kr)}{m},$$

$$a33 = -\frac{2(Kf + Kr)}{mV}, a36 = \frac{2Kf}{mn},$$

$$a51 = \frac{2\xi \cdot lf \cdot Kf}{n \cdot Is \cdot V}, a52 = -\frac{2\xi \cdot lf \cdot Kf}{n \cdot Is}, a53 = \frac{2\xi \cdot Kf}{n \cdot Is \cdot V},$$

$$a55 = -\frac{Cs}{Is}, a56 = -\frac{2\xi \cdot Kf}{n^2 Is},$$

$$a72 = -\frac{Kp \cdot h \cdot Tp \cdot V}{Tn}, a74 = -\frac{Kp \cdot h}{Tn}, a75 = -Kp,$$

$$a76 = -\frac{Kp}{Tn}, a77 = -\frac{1}{Tn},$$

$$b12 = \frac{1}{I}, b51 = \frac{1}{Is}$$

In the expression (8), the state vector X is (dψ/dt(=γ), ψ, dyc/dt, yc, dθsw/dt, θsw, Td). It should be noted that the steering torque Td as an index value representing the driving state of the driver as well as an index value representing the motion state of the vehicle is included in the state vector X. Besides, the input vector u is (Ta, Mz). Incidentally, the term of the difference yc−yd* between the actual lateral position and the target lateral position is included in the right side in the expression (6). However, the target lateral position is an amount whose reference can be set to an arbitrary position with respect to the vehicle, and is always used in the form of the difference between the target lateral position and the actual lateral position in the feedback input values. Therefore, for the sake of convenience, the target lateral position is described as the lateral position yc in the expression (8).

Thus, in the equation of state of the aforementioned expression (8), according to the theory of the optimal regulator, when an evaluation function J of a quadratic form shown below assumes a minimum value, the state vector X stably converges to a target state vector X* thereof ((dψ/dt)*, ψ*, (dyc/dt)*, yc*, (dθsw/dt)*, θsw*, Td*).

[Formula 6]

$$J = \int_0^\infty \begin{pmatrix} q_{\dot\psi}(\dot\Psi - \dot\Psi^*)^2 + q_\Psi(\Psi - \Psi^*)^2 + q_{\dot yc}(\dot yc - \dot yc^*)^2 + \\ q_{yc}(yc - yc^*)^2 + q_{\dot\theta sw}(\dot\theta sw - \dot\theta sw^*)^2 + \\ q_{\theta sw}(\theta sw - \theta sw^*)^2 + q_{Ts}(Td - Td^*)^2 + r1 \cdot Ta^2 + \\ r2 \cdot Mz^2 \end{pmatrix} dt \quad (10)$$

It should be noted herein that q and r of the respective terms are weight coefficients. When the weight of a certain one of the terms is increased, the components of that term is relatively more stably converged. Then, while the input vector u that minimizes the evaluation function J is given by an expression: u=−K·(X−X*) ... (11), a matrix K is calculated by solving a Riccati equation. This matrix K has the following form.

[Formula 7]

$$K = \begin{bmatrix} K11 & K12 & K13 & K14 & K15 & K16 & K17 \\ K21 & K22 & K23 & K24 & K25 & K26 & K27 \end{bmatrix} \quad (12)$$

Therefore, after all, the steering assist torque Ta and the difference in braking/driving force between the right and left wheels (the yaw moment) Mz are given as follows.

[Formula 8]

$$\begin{aligned} Ta = &-K11(\dot\Psi - \dot\Psi^*) - K12(\Psi - \Psi^*) - K13(\dot yc - \dot yc^*) - K14(yc - yc^*) - \\ & K15(\dot\theta sw - \dot\theta sw^*) - K16(\theta sw - \theta sw^*) - K17(Td - Td^*) \end{aligned} \quad (13)$$

$$\begin{aligned} Mz = &-K21(\dot\Psi - \dot\Psi^*) - K22(\Psi - \Psi^*) - K23(\dot yc - \dot yc^*) - \\ & K24(yc - yc^*) - K25(\dot\theta sw - \dot\theta sw^*) - \\ & K26(\theta sw - \theta sw^*) - K27(Td - Td^*) \end{aligned}$$

That is, K11 to K27 denote feedback gains, and are functions of vehicle motion characteristic values representing the motion characteristics of the vehicle and driver driving characteristic values representing the driving characteristics (the steering characteristics in the case of the present embodiment of the invention) of the driver. Incidentally, as described above, the vehicle speed is treated as a vehicle motion characteristic value in state feedback of the present embodiment of the invention.

In the case where driving support control according to the aforementioned state feedback control is performed during running of the vehicle, the feedback gains K11 to K27 are calculated using the vehicle motion characteristic values and the driver driving characteristic values, and are multiplied by differences between current values of respective components of the state vector X and target values of the respective corresponding components. Thus, the steering assist torque Ta and the difference in braking/driving force between the right and left wheels (the yaw moment) Mz as feedback input values are calculated. In computing the feedback gains K11 to K27, the vehicle motion characteristic values are constants in principle, except for the vehicle speed. Therefore, values prepared in advance may be used as the vehicle motion characteristic values. A momentarily detected value may be used as the vehicle speed. As will be described later, the driver driving characteristic values are estimated using vehicle motion index values and driving state index values during running of the vehicle, and are utilized to compute the feedback gains K11 to K27. Besides, the target values of the respective components of the state vector X may be calculated by performing computation on the assumption that the mechanical target lateral position Ys* that is determined based on information on the periphery of the vehicle and information on the future locus is realized in driving the vehicle, by a normative driver model, namely, a model of the driver having ideal response characteristics in driving the vehicle.

Thus, in accordance with the principle of driving support control according to the aforementioned state feedback control, the feedback gains K11 to K27 are functions of the driver driving characteristic values. The steering assist torque Ta and the difference in braking/driving force between the right and left wheels (the yaw moment) Mz, which are calculated using those feedback gains, are determined such that the vehicle motion index values and the driving state index values converge to the respective target values for achieving the mechanical target lateral position Ys* under the condition that there is a behavior in driving based on the driving characteristics of the driver. According to this configuration, the driving behavior of the driver is taken into account in state feedback, so the deviation between the driver's steering and the input required for feedback control is expected to be reduced.

Configuration of Driving Support Control Apparatus

In the vehicle to which the driving support control apparatus according to the invention is applied, driving of the vehicle is achieved by the operation of the steering mechanism and the braking/driving force distribution mechanism for the right and left wheels according to the driver's steering and the controlled variables that are determined through driving support control in an assist control computer. Then, as described above, in driving support control according to the present embodiment of the invention, the structure that gives a response of the motion of the vehicle and the structure that gives a response in the driver's driving are considered to be an integral system, and the steering assist torque and the difference in braking/driving force between the right and left wheels, which are calculated using the theory of the optimal regulator, are given to the steering torque assist mechanism (the steering device 20) and the right/left-wheel braking/driving force distribution mechanism (the right/left driving force distribution differential or the braking devices for the respective wheels) respectively as feedback input values.

Figure 2A:
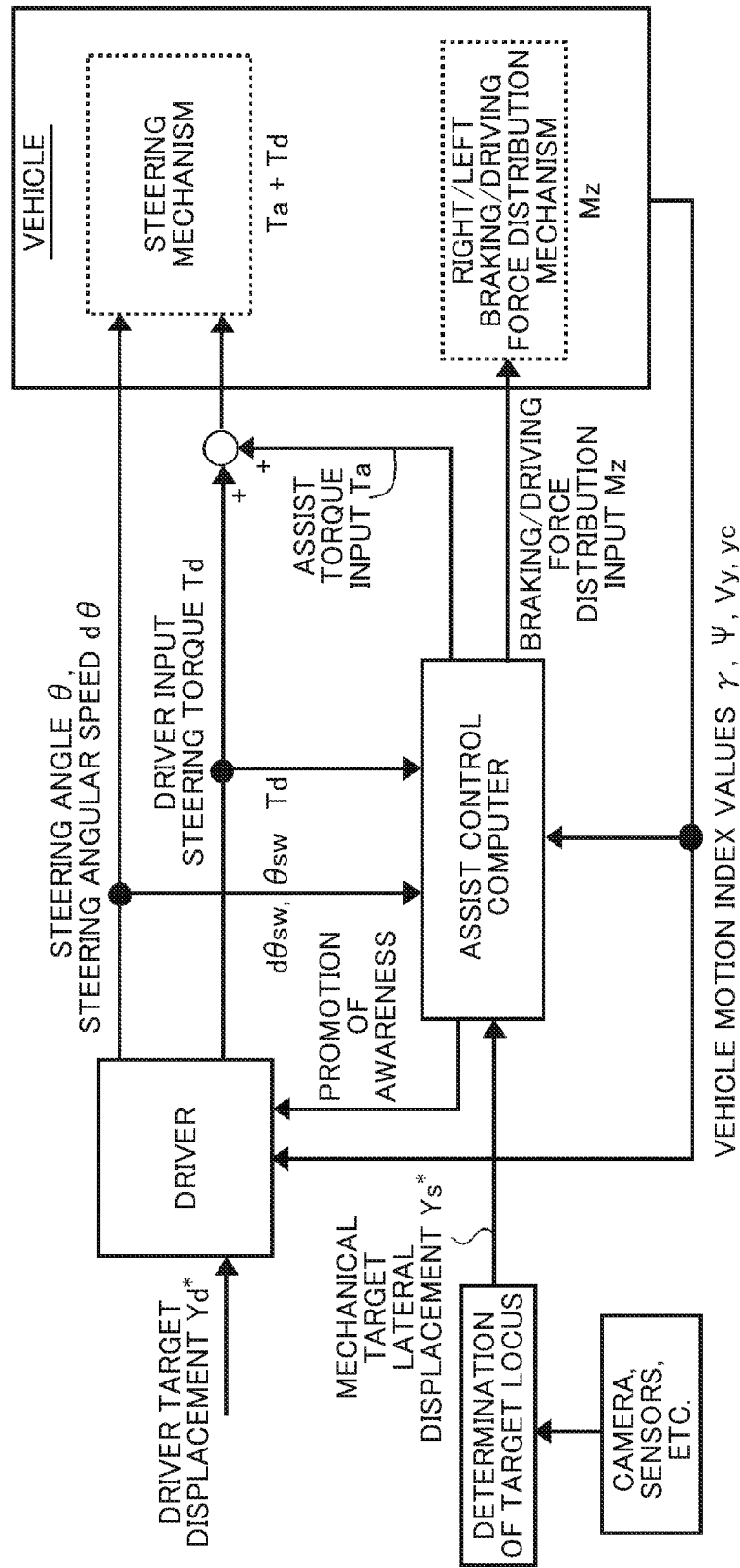
FIG. 2A is a view representing a system that is constituted by the driving support control apparatus for the vehicle according to the embodiment of the invention, in the form of a block diagram.

In the concrete configuration of the system including the driver in the art of driving support control according to the embodiment of the invention, referring to FIG. 2A, the driver first steers the steering wheel in consideration of the current state of the vehicle, for example, a lateral displacement amount yc, the yaw rate $\gamma$, a yaw angle $\psi$, a lateral speed Vy, a vehicle speed V and the like of the vehicle, such that a driver target displacement yd* that is determined based on the information found by the driver himself or herself is achieved. Thus, the steering angle $\theta$sw, a steering angular speed d$\theta$sw/dt, and the steering torque Td (the driver input torque) are given to the steering mechanism of the vehicle. It should be understood that the actual driver does not concretely determine the value of the driver target displacement yd* but determines a position desired to be reached through visual observation during driving, and steers the vehicle toward the position while following his or her own senses, and by the same token, that the actual driver does not take the current state of the vehicle into account not by referring to those values but through visual observation and physical sensation.

On the other hand, the target lateral displacement (the mechanical target lateral displacement) Ys* from the target locus determination unit, index values (the vehicle motion index values) representing the current state of the vehicle such as the lateral displacement amount yc, the yaw rate $\gamma$, the yaw angle $\psi$, the lateral speed Vy (=dyc/dt), the vehicle speed V and the like of the vehicle, and also index values (the driving state index values) representing the current driving state of the driver such as the steering angle $\theta$sw, the steering angular speed d$\theta$sw/dt, the steering torque Td (the driver input steering torque) and the like are input to the assist control computer. The mechanical target lateral displacement Ys* (=yc*) is a value obtained from a target locus that is determined in such a manner as to optimally realize driving of the vehicle (e.g., which may be a favorable running route (a favorable future locus) that is set for a destination desired by the driver) using information on the periphery of the vehicle, for example, information on the position of a white line on the road, the presence or absence and positions of preceding vehicles and obstacles, the direction of extension of the road and the like obtained from a camera or the like, and information on a road line shape and the like of a route or a course obtained from a GPS device or the like, according to an arbitrary method, in the target locus determination unit. That is, the mechanical target lateral displacement Ys* is a target value of the motion of the vehicle in the control based on the mechanical input, which is determined regardless of the driver's steering. As will be described later, target values of the motion of the vehicle (vehicle motion target values) and target values of the driving state of the driver (driving state target values) for calculating controlled variables in steering torque assist control and braking/driving force distribution control for the right and left wheels, which are performed as driving support control, are further calculated from this mechanical target lateral displacement Ys*. Besides, the lateral displacement amount yc (and the target value yc* thereof) of the vehicle may be a lateral displacement of the vehicle from an arbitrarily set reference point, and the position of the vehicle may be used as the reference point (the lateral displacement amount yc is always equal to 0 in this case). Then, in an aspect that will be described later, the assist control computer calculates a steering assist torque input Ta (a target value of the steering assist torque) that is given in addition to the driver input torque Td, and the braking/driving force distribution input (the yaw moment) Mz (a target value of the difference in braking/driving force between the right and left wheels) corresponding to the difference in braking/driving force between the right and left wheels that should be generated by the right/left-wheel braking/driving force distribution mechanism, based on the foregoing pieces of input information. The assist control computer gives the calculated values to the steering mechanism and the right/left-wheel braking/driving force distribution mechanism of the vehicle respectively, as control commands.

Configuration and Operation of Assist Control Computer

Figure 2B:
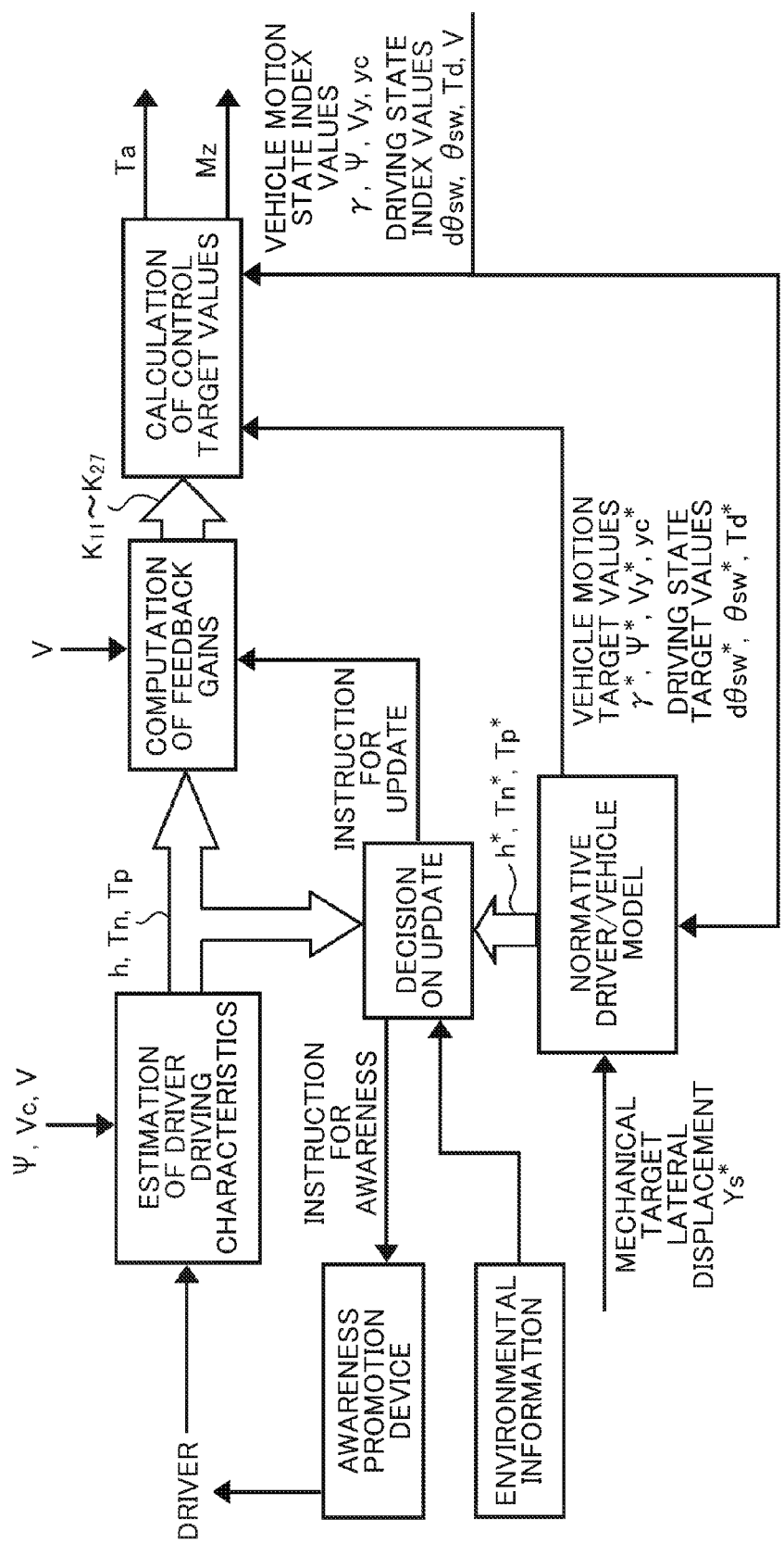
FIG. 2B is a view representing the configuration of an assist controller in the driving support control apparatus for the vehicle, in the form of a block diagram.

Referring to FIG. 2B, in the assist control computer, the mechanical target lateral displacement Ys* that is given from the target locus determination unit, the steering angle $\theta$sw resulting from the driver's driving, the differential value d$\theta$sw/dt thereof and the steering torque (the driver input torque) Td as the driving state index values, and the yaw rate $\gamma$, the yaw angle, the lateral speed, the lateral position and the like in the vehicle as the vehicle motion index values are referred to, and the steering assist torque input Ta and the braking/driving force distribution input Mz for the right and left wheels, which are expressed by the expression (13) described above, are calculated. In this case, the driving characteristic values of the driver, the feedback gains, the vehicle motion target values, the driving state target values and the like are necessary. Therefore, the calculation of these values is also appropriately carried out. Incidentally, in actual control, the lateral displacement yc and the yaw angle $\psi$ of the vehicle may be values that are measured from an arbitrarily set reference point and an arbitrarily set reference direction. The respective values are 0 when the reference point and the reference direction are set for the vehicle.

In the assist control computer, more specifically, first in a normative driver/vehicle model unit, vehicle motion target values ($\gamma$* (=d$\psi$/dt*), $\psi$*, yc*, Vy (=dyc/dt*)) and driving state target values (d$\theta$sw/dt*, $\theta$sw*, Td*) on the assumption that the mechanical target lateral displacement Ys* is achieved by carrying out driving as a norm are calculated, using an arbitrary model describing the response of the driver and the motion of the vehicle as a norm, with reference to the mechanical target lateral displacement Ys* and a series of the vehicle motion index values that are given from the target locus determination unit. Incidentally, a value equal to the mechanical target lateral displacement Ys* may usually be used as the lateral position target value yc*. Besides, in the normative driver/vehicle model unit, the normative driver may be assumed to carry out steering according to the forward gaze model. In this case, a steering gain h*, a first-order lag time constant Tn*, a forward gaze time Tp* of the driver who drives the vehicle ideally are arbitrarily set in advance and used as driving characteristic values of the normative driver. Besides, normative driving characteristic values are also used in a later-described process of updating the feedback gains.

Besides, in a driver driving characteristic estimation unit in the assist control computer, estimation of the current driving characteristic values of the driver is carried out using the mechanical target lateral displacement Ys*, the vehicle motion index values, and the driving state index values. In concrete terms, for example, on the assumption that the driver's driving follows the forward gaze model, a steering gain h of the driver, a first-order lag time constant Tn and a forward gaze time Tp may be estimated using the foregoing expressions (4) and (5) and/or the relational expression (6). This estimation may be carried out according to an arbitrary method, for example, may be figured out through the fitting of the expression (6) using the current vehicle motion index values and the current driving state index values. Incidentally, the mechanical target lateral displacement Ys* may be substituted for the target lateral position yd* of the driver. This estimation of the driving characteristic values may be carried out on a timely basis or sequentially after the start of the driving of the vehicle. Thus, the current characteristics in the driver's driving can be reflected by the feedback gains.

Next, in a feedback gain computation unit, the feedback gains K11 to K27 in the form of the expression (12) described above are calculated using the aforementioned estimated driving characteristic values and the vehicle motion characteristic values prepared in advance (the vehicle weight, the cornering power of the front wheels, the cornering power of the rear wheels and the like). Then, in a control target value calculation unit, the control target values, namely, the steering assist torque input Ta and the right/left-wheel braking/driving force distribution input Mz as state feedback input values are calculated through the use of the expression (13), using the feedback gains K11 to K27, the differences between the current vehicle motion index values and the vehicle motion target values and/or the differences between the current driving state index values and the driving state target values. Incidentally, in certain embodiments of the invention, all the differences between the vehicle motion index values and the vehicle motion target values are not absolutely required to be used in the expression (13). In state feedback control, the differences between the vehicle motion index values and the vehicle motion target values may be used especially as to only those vehicle motion index values which should be reliably converged. For example, when it is desirable to reliably converge only the lateral position of the vehicle to its target value, the steering assist torque Ta and the torque vectoring amount Mz may be computed according to an expression shown below.

$$Ta = -K11 \cdot \dot{\psi} - K12 \cdot \psi - K13 \cdot \dot{y}c - K14(yc - yc^*) - K15 \cdot \dot{\theta}sw - K16 \cdot \theta sw - K17 \cdot Td \quad \text{[Formula 9]}$$

$$Mz = -K21 \cdot \dot{\psi} - K22 \cdot \psi - K23 \cdot \dot{y}c - K24(yc - yc^*) - K25 \cdot \dot{\theta}sw - K26 \cdot \theta sw - K27 \cdot Td \quad (14)$$

Thus, the aforementioned steering assist torque Ta and the aforementioned torque vectoring amount Mz are given to the steering mechanism of the vehicle and the right/left-wheel braking/driving force distribution mechanism of the vehicle respectively. Incidentally, the parameters corresponding to the terms in which the differences between the target values and the index values are not used in the aforementioned expression are also functions of the mechanical target lateral displacement Ys*. Therefore, the respective index values substantially follow their target values.

Update of Feedback Gains

It is favorable that the driving characteristic values used to compute the aforementioned feedback gains be as accurate as possible. In fact, however, the driving characteristics of the driver can change depending on changes in physical condition of the driver, the degree of fatigue of the driver, or the running environment of the vehicle. Accordingly, the feedback gains may be updated using the latest driving characteristic values that are estimated on a timely basis or sequentially during running of the vehicle. In regard to this point, the update of the feedback gains may be regularly carried out, for example, at intervals of a predetermined time. However, if the time interval is too short for changes in the driving characteristic values, the computation load becomes high. On the contrary, if the time interval is too long for changes in the driving characteristic values, the accuracy of the feedback gains decreases. Thus, in the aspect of the invention, changes in the differences between actually estimated driving characteristic values (estimated driving characteristic values) and the normative driving characteristic values may be detected, and the update, namely, the re-computation of the feedback gains may be carried out when the magnitudes of the differences between the estimated driving characteristic values and the normative driving characteristic values become large due to changes in the actual driving characteristic values.

In evaluating the differences between the estimated driving characteristic values and the normative driving characteristic values, more specifically, for example, an evaluation function Q of a quadratic form of the differences between the estimated driving characteristic values (h, Tn, Tp) and the normative driving characteristic values (h*, Tn*, Tp*) as described below may be calculated, and the update of the feedback gains may be carried out using the most recently estimated driving characteristic values, when the magnitude of this evaluation function Q exceeds a predetermined threshold. $Q = q_h(h-h^*)^2 + q_{Tn}(Tn-Tn^*)^2 + q_{Tp}(Tp-Tp^*)^2 \ldots$ (15). It should be noted herein that $q_h$, $q_{Tn}$ and $q_{Tp}$ are weight coefficients. When the magnitude of each of $q_h$, $q_{Tn}$ and $q_{Tp}$ increases, the contribution of changes in a corresponding one of the driving characteristic values increases, so the sensitivity of the evaluation function Q to that driving characteristic value increases. The weight coefficients $q_h$, $q_{Tn}$ and $q_{Tp}$ may be arbitrarily set. The weight coefficients $q_h$, $q_{Tn}$ and $q_{Tp}$ may be constants, but may be variable depending on, for example, the peripheral environment of the vehicle, the driving time, the driver's driving habit and the like. Thus, the assist controller of FIG. 2B is provided with an update decision unit. The update decision unit may be configured to acquire the most recently estimated driving characteristic values (h*, Tn, Tp) from the driver driving characteristic estimation unit and the normative driving characteristic values (h*, Tn*, Tp*) from the normative driver/vehicle model unit, receive arbitrary information (environmental information) for adjusting the weight coefficients $q_h$, $q_{Tn}$ and $q_{Tp}$, such as information on the peripheral environment of the vehicle, the driving time, the driver's driving habit and the like, hence calculate the aforementioned evaluation function Q sequentially, and issue an instruction to update the feedback gains to the feedback gain computation unit when the evaluation function Q exceeds an arbitrarily set threshold.

Figure 3:
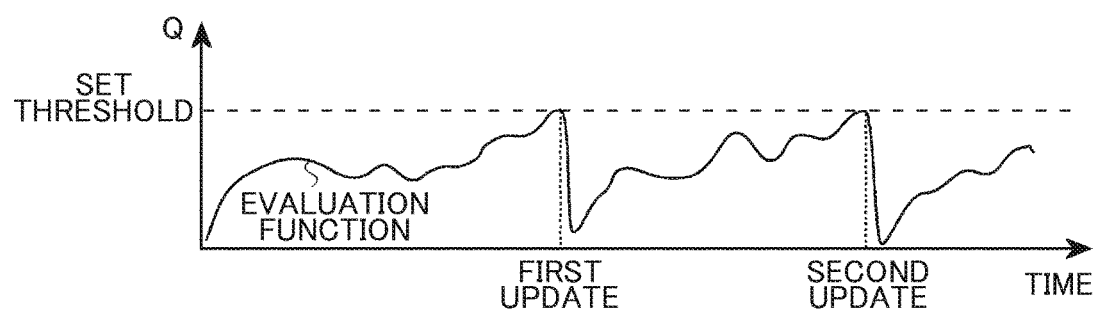
FIG. 3 is a view showing an example of changes in an evaluation function of a driver characteristic value with time.

FIG. 3 schematically shows changes in the aforementioned evaluation function Q during driving of the vehicle. Incidentally, in the aforementioned evaluation function Q, the estimated driving characteristic values (h, Tn, Tp) are estimated using the vehicle driving index values and the driving state index values during driving of the vehicle as described already. Therefore, the estimated driving characteristic values during the performance of driving support control according to the invention are the driving characteristic values with driving supported through control. That is, the estimated driving characteristic values are not driving characteristic values peculiar to the driver but "apparent" driving characteristic values of the driver who receives driving support. Accordingly, during the performance of driving support control according to the invention, for a certain period immediately after the computation of the feedback gains through the use of the most recently estimated driving characteristic values, the driving characteristics that are realized in the vehicle are close to the driving characteristics of the normative driver model owing to the performance of the control in which the accurately estimated driving characteristic values are used, and the differences between the estimated driving characteristic values and the normative driving characteristic values are small. Thus, the value of the evaluation function Q is expected to be small. However, as exemplified in FIG. 3, when the driving characteristics of the driver change with the lapse of time, the estimated driving characteristic values change accordingly. As a result, the differences between the normative driving characteristic values and the estimated driving characteristic values become large, and the value of the evaluation function Q increases. Then, when the value of the evaluation function Q reaches the set threshold, the update of the feedback gains is carried out using the most recently estimated driving characteristic values (the first update). Then, the computation of the controlled variables of driving support control is carried out with the most recently estimated driving characteristic values. Therefore, the motion of the vehicle approaches the motion in the case of the normative driver model, the differences between the normative driving characteristic values and the estimated driving characteristic values decrease, and the value of the evaluation function Q is reduced. In this manner, the driving characteristics of the driver further change with the lapse of time after the evaluation function Q has decreased through the update of the feedback gains, changes in the estimated driving characteristic values and an increase in the evaluation function Q are caused. When the evaluation function Q reaches the set threshold again, the update of the feedback gains is carried out (the second update). Thus, the motion of the vehicle approaches the motion in the case of the normative driver model, and the value of the evaluation function Q is reduced. This series of changes in the evaluation function Q and the update of the feedback gains are repeated during the performance of driving support control in driving the vehicle.

Incidentally, as regards the definition of the evaluation function of the magnitudes of the differences between the normative driving characteristic values and the estimated driving characteristic values, in the case where the evaluation function is defined as a function that decreases as the magnitudes of the differences between the normative driving characteristic values and the estimated driving characteristic values increase, the update of the feedback gains may be carried out when the evaluation function drops below a predetermined threshold.

Promotion of Awareness of Driver

By the way, the aforementioned changes in the estimated driving characteristic values often occur when the degree of change in the driving characteristics of the driver is large or drastic. In this case, the number of times the feedback gains are updated becomes large. This situation assumes a case where the driver does not feel well, a case where the running environment of the vehicle drastically changes, and the like. Thus, with a view to making the driver realize such a situation, in the invention, an awareness promotion that promotes the awareness of the driver, for example, displaying a warning, issuing an alarm etc. when the number of times the feedback gains are updated exceeds a predetermined number of times may be provided. In concrete terms, in the assist controller of FIG. 2B, the update decision unit may be configured to further count the number of times the feedback gains are updated, and send an instruction to promote awareness to an awareness promotion device when the counted number of times reaches a predetermined number of times. The awareness promotion device may be configured to issue an alarm to the driver upon receiving the instruction to promote awareness. The alarm may be issued in the form of a sound, a sign on a display or the like. According to this configuration, the driver can grasp the degree of change in the response characteristics in his or her own driving. Therefore, there is an advantage in that the security during running of the vehicle can be enhanced.

Besides, the information on the number of times the feedback gains are updated can be leveraged for driving behavioral analysis. For example, when the number of times the feedback gains are updated is small in the city streets but large on freeways as to a certain driver, it is possible to analyze that the driving characteristics are likely to change on freeways. The driver may be notified of such a result.

Thus, in the aforementioned driving support control apparatus according to the embodiment of the invention, the structure that gives a response of the motion of the vehicle and the structure that gives a response in the driver's driving are considered to be an integral system, and the theory of the optimal regulator is applied to the system to determine and realize the target value of the steering assist torque and the target value of the difference in braking/driving force between the right and left wheels as state feedback inputs. According to this configuration, as mentioned already, the controlled variables that are given as state feedback inputs are calculated in consideration of the response in the driver's driving. Therefore, in the process of realizing the target state required through the mechanical input, the deviation between the motion of the vehicle according to the controlled variables and the motion of the vehicle intended in the driver's steering is expected to be smaller than in the case where the controlled variables are treated as a disturbance without taking the response in the driver's driving into account. That is, in driving support control according to the embodiment of the invention, in the process of realizing the target state required through the mechanical input, the deviation between the driver's steering and mechanical control (steering torque assist control and right/left-wheel braking/driving force distribution control) is reduced, and an attempt is made to reduce the feeling of strangeness developed by the driver for the control operation.

The foregoing has been described in association with the embodiment of the invention, but many corrections and alterations can be easily carried out by those skilled in the art. The invention is not limited only to the embodiment thereof exemplified above. It would be obvious that the invention is applied to various apparatuses without departing from the concept thereof.

What is claimed is:

1. A driving support control apparatus for a vehicle that is equipped with a steering assist mechanism and a braking/driving force distribution mechanism for right and left wheels, comprising:
- a vehicle motion index value acquisition portion that acquires a vehicle motion index value as an index value of a motion state of the vehicle;
- a driving state index value acquisition portion that acquires a driving state index value as an index value of a driving state of a driver of the vehicle;
- a driver driving characteristic value estimation portion that estimates a driver driving characteristic value representing driving characteristics of the driver, based on the vehicle motion index value and the driving state index value;
- a vehicle motion/driving state target value determination portion that determines a vehicle motion target value as a target value of the vehicle motion index value and a driving state target value as a target value of the driving state index value in driving support control, regardless of the driver's steering;
- a control target value determination portion that determines a target value of a steering assist torque and a target value of a difference in braking/driving force between the right and left wheels that converge at least one of a difference between the vehicle motion target value and the vehicle motion index value and a difference between the driving state target value and the driving state index value, using a vehicle motion characteristic value representing motion characteristics of the vehicle, the driver driving characteristic value, the vehicle motion index value and the driving state index value;
- a steering assist torque control portion that controls a steering assist torque that is given by the steering assist mechanism, to the target value of the steering assist torque; and
- a right/left braking/driving force difference control portion that controls a difference in braking/driving force between the right and left wheels that is given by the braking/driving force distribution mechanism for the right and left wheels, to the target value of the difference in braking/driving force between the right and left wheels.

2. The apparatus according to claim 1, wherein
the control target value determination portion includes
- a feedback gain calculation portion that calculates a feedback gain that converges at least one of the difference between the vehicle motion target value and the vehicle motion index value and the difference between the driving state target value and the driving state index value, using a theory of an optimal regulator, from an equation of state representing the motion state of the vehicle and the driving state of the driver, which is obtained by making respective equations of motion in a lateral direction of the vehicle, a yaw direction of the vehicle and a rotational direction of steered wheels that are represented using the vehicle motion characteristic value, and also an equation of state that gives a steering torque of the driver that is represented using the estimated driver driving characteristic value, simultaneous with one another, and
- a control target value calculation portion that calculates the target value of the steering assist torque and the target value of the difference in braking/driving force between the right and left wheels, using at least one of the difference between the vehicle motion target value and the vehicle motion index value and the difference between the driving state target value and the driving state index value, and the feedback gain.

3. The apparatus according to claim 2, wherein
the feedback gain calculation portion updates the feedback gain using the most recently estimated driver driving characteristic value, when a predetermined condition is fulfilled.

4. The apparatus according to claim 3, wherein
the feedback gain calculation portion carries out update of the feedback gain when an evaluation function that increases/decreases as a magnitude of a difference between the estimated driver driving characteristic value and a normative driver driving characteristic value as a driver driving characteristic value of a corresponding normative driver model increases/decreases, deviates from a predetermined range.

5. The apparatus according to claim 4, wherein
the evaluation function is a function of a difference between the estimated driver driving characteristic value and the normative driver driving characteristic value, and further increases/decreases based on a driving history of the driver and the driving characteristics of the driver and/or information on a periphery of the vehicle.

6. The apparatus according to claim 4, further comprising:
an awareness promotion portion that carries out promotion of awareness of the driver when a number of times the feedback gain is updated exceeds a predetermined number of times.

7. The apparatus according to claim 1, wherein
the vehicle motion target value and the driving state target value are a vehicle motion index value and a driving state target value that are calculated on an assumption that a target displacement of the vehicle, which is determined based on information on a periphery of the vehicle or a target course of the vehicle, is realized by a normative driver model, respectively.

* * * * *